Sept. 9, 1941. W. W. MYDDLETON 2,255,126
METHOD OF CONTROLLING TEMPERATURE OF EXOTHERMIC CATALYTIC REACTIONS
Filed Aug. 26, 1937.
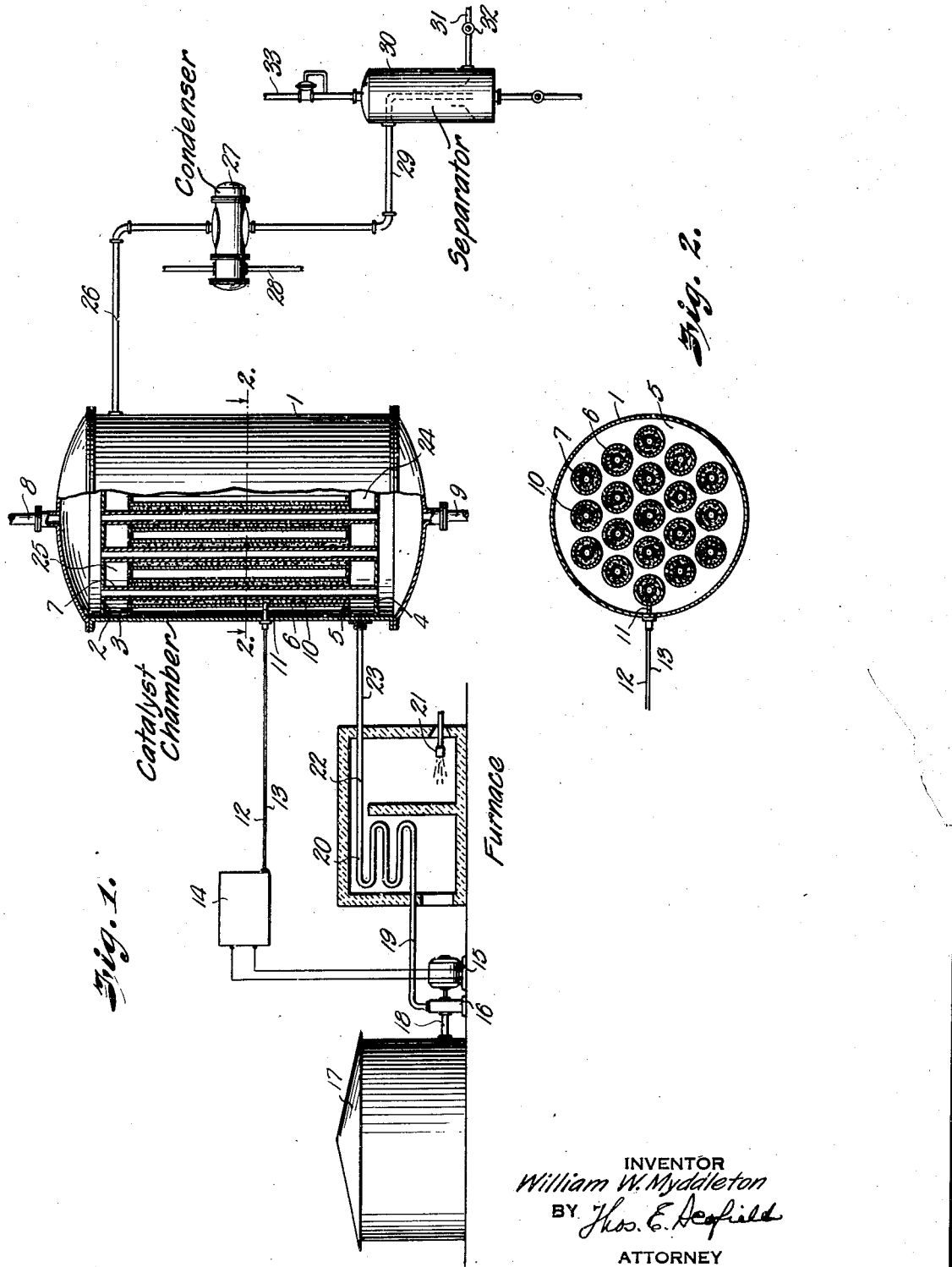
INVENTOR
William W. Myddleton
BY
ATTORNEY Patented Sept. 9, 1941

2,255,126

UNITED STATES PATENT OFFICE 2,255,126

METHOD OF CONTROLLING TEMPERATURE OF EXOTHERMIC CATALYTIC REACTIONS

William Whalley Myddleton, New Malden, England, assignor, by mesne assignments, to The M. W. Kellogg Company, Jersey City, N. J., a corporation of Delaware Application August 26, 1937, Serial No. 161,106
In Great Britain May 21, 1937

6 Claims. (Cl. 260—449)

This invention relates to processes in which gases or vapors are reacted on the surfaces of a catalyst to produce compounds of higher molecular weight than the reactants: more particularly it relates to processes for the production of hydrocarbon oils by reactions, in the presence of a catalyst, of mixtures of gases containing hydrogen and carbon-monoxide and optionally other gaseous constituents such as carbon-dioxide.

In the accompanying drawing which forms part of the instant specification and is to be read in conjunction therewith and in which like reference numerals are used to indicate like parts in the various views:

Figure 1 is a diagrammatic view of one form of apparatus capable of carrying out the process of my invention.

Figure 2 is a sectional view, taken on a line 2—2 of Figure 1.

An example of such processes consists in passing, at substantially atmospheric pressure, a gaseous mixture composed of 48% hydrogen, 41% carbon monoxide and 11% other gases, all on a volume basis, over a suitable catalyst such as one composed of nickel and the oxides of manganese and aluminum on kieselguhr and obtaining a yield of normally liquid hydrocarbons amounting to 109 grams per cubic meter of inlet gases. Other suitable catalysts such as cobalt with thorium oxide on kieselguhr may be employed.

In carrying out such processes the catalyst may be in any suitable form, such as in either porous or solid particles, or it may be a skeletonised mass the surface of which is activated and which mass contains interstices to permit the passage of the gases through and around it, or it may take the form of metal turnings or chips. It may be contained in a vertical tube of either circular or other cross section or it may be disposed in layers of suitable thickness on trays or plates in a container of cylindrical or other shape. Such tubes or trays may be advantageously provided with heat conducting diaphragms attached to the supporting surface. It has been found in many cases desirable to use a catalytic bed formed by a mass of granular material contained in a vertical tube of circular cross-section; indeed this is a preferred arrangement in the case of hydro-carbon syntheses. The reaction constituents are normally passed downward continuously over the catalyst but the direction of flow is not inherent to the mechanism of such processes. Synthesis reactions of this type are usually exothermic and moreover often require close temperature control, and it is necessary usually to provide cooling means for maintaining the required temperature, which in the case of the hydrocarbon syntheses, employing certain now known catalysts, is in the neighborhood of 392° F. Any considerable increase of temperature above the optimum value for such reactions causes an appreciable reduction in the yield of the required products. Satisfactory results have been obtained by the use of catalyst tubes some 16 millimeters in diameter containing a catalytic bed some two feet in depth, but the volume of gas which can be treated by a catalytic bed of this size in a given time is necessarily small and it would be far more economical to employ a bed of larger dimensions if this were possible. It is found, however, that if either the diameter of the tube or the depth of the bed is increased substantially and the rate of flow of gas correspondingly increased, overheating of the catalyst takes place. It has been considered hitherto that if the velocity of the gases entering the chamber is increased substantially above that required for a catalytic bed two feet in depth, that satisfactory cooling can be obtained only by the use of containers so dimensioned that the maximum distance from any point in the catalyst mass to the nearest heat absorbing surface is not over 3.5 millimeters; i. e., in the case of catalyst contained in a tube the maximum tube diameter would be 7 millimeters. The advantage gained by the increased velocity of the gases and the increased depth of catalyst must be offset against the reduction in diameter of the tube.

I have found that, at least initially, the overheating which takes place when the velocity of the reaction gases is increased is confined to a very shallow layer at the upper surface of the catalytic bed. It appears to be initiated on small areas or irregularities or projections on the topmost catalyst granules or particles which become inflamed and soon communicate their excessive temperature to the neighboring portions of the catalytic mass. This observed effect may merely be the overall result of an intensely active chemical reaction between the synthesis gases on particularly active centers; the exact mechanism is difficult, and at present, impossible to determine. On the basis of experiments it was found desirable to prevent a temperature rise of more than approximately 54° F. in the hottest layer of the catalyst. I have found that this overheating can be prevented by at first limiting the velocity of the entering gases to a sufficiently low value so that the temperature rise of a specified point or points in the catalyst bed does not increase above a predetermined value, as determined by thermocouple or other adequate thermometric device suitably placed, and thereafter either continuously or in stepwise fashion increasing the velocity of the gas flow to a desired rate, in such a way to not exceed the predetermined temperature of the catalyst mass. The desired incremental increase in the gas flow rate may be made by hand control or may be effected by suitable automatic devices for regulating gas flow actuated by the thermometric device installed in the catalyst bed.

The exact physical structure of catalytic surfaces is very difficult to define with certainty and the exact mechanism which is responsible for the overheating which occurs when a new or freshly activated catalyst mass is first put in service is difficult to determine. It may be that during the preparation of the catalyst a certain proportion of very active catalytic centers or areas are established, in addition to those responsible for the principal desired reactions, which are the cause of the overheating. Optionally, the overheating may be caused by or localised on the small projections or irregularities referred to above which are removed or are rendered less active in some way (possibly by mechanical action or possibly by slow sintering) during the initial period when the gas velocity is low and there is little or no danger of overheating, so that by the time the full velocity is attained the surfaces of the topmost granules on which the gases impinge have in part, at least, been rendered less active and possibly to an extent smoothed and sintered. It is also probable that during the period when the low rates of gas flow are employed, similar modification of certain very active catalyst centers and areas takes place throughout the entire mass of catalyst thereby conditioning it for the desired principle synthesis reactions to proceed as desired.

The catalyst chamber 1 is fitted with a first upper tube sheet 2 and a second upper tube sheet 3, a first lower tube sheet 4 and a second lower tube sheet 5. Large diameter tubes 6 extend between tube sheets 3 and 5. Small diameter tubes 7 extend between tube sheets 2 and 4, forming annular spaces with large diameter tubes 6. Any suitable cooling medium enters through pipe 8, passes through small diameter tubes 7 and is withdrawn through pipe 9. A temperature responsive device such as a pyrometer 11 is imbedded in the catalyst material 10, housed between the small diameter and the large diameter tubes. A pair of conductors 12 and 13 connect the output of the pyrometer 11 to a control device 14 which is adapted to control the speed of an electric motor 15 which operates the charging pump 16. The gases to be charged to the synthesis are stored in tank 17. The pump 16 takes suction through pipe 18 and delivers the gases through pipe 19 through coil 20, adapted to be heated by convection heat from combustion gases from burner 21 and then through pipe 22 in which the gases are heated to the desired temperature by radiant heat. The heated gases pass through transfer line 23 into the space 24 formed by lower tube sheets 4 and 5, and pass upwardly through the catalyst material into the space 25 formed by the upper tube sheets 2 and 3. The synthesis vapors are withdrawn through pipe 26 and passed through a condenser 27, to which a cooling medium is supplied through pipe 28. The condensate and uncondensed gases are withdrawn from the condenser through pipe 29 and passed into a separator 30 from which the desired synthesized liquids are withdrawn through pipe 31, controlled by valve 32. The unreacted gases are withdrawn from the separator through pipe 33 controlled by a back pressure controlled valve 34.

It will be understood that the correctness or otherwise of this theory is immaterial to my invention which consists essentially in the practical application of my discovery that the overheating of the catalyst which occurs when the synthesis gases are passed over a new or freshly reactivated catalyst at the substantially full operating flow rate can be prevented by starting the operation of a catalyst bed with a low gas velocity and only later increasing it to the normal working rate either gradually or stepwise.

I have found, for example, that in hydrocarbon synthesis that by the application of my invention it is possible to use a catalytic bed at least six feet in depth without causing overheating and without reducing the cross-section of the container; indeed I have found that where the catalyst mass is contained in tubes, it is possible to increase the diameter of the tubes to at least one inch or in the case of containers of rectilinear cross-section to an equivalent area.

The yield obtainable from a single treating unit is thus very much in excess of what has hitherto been possible. By way of example of the method of carrying out my invention I may mention that with a catalytic bed of the dimensions given (one inch in diameter by six feet in length) where it is desired to work at a rate of flow of gases of 900 liters per hour, I find that overheating is prevented if when putting a catalyst mass into service the rate of flow is limited to six liters per hour, then after an interval increased to 20 liters per hour, after another interval to 60 liters, after another to 100 liters and so on by stages until some two and a half hours after the start of the process the full rate of 900 liters has been attained. It will, however, be understood that my invention is in no way confined to the particular dimensions, rates and times mentioned, which are given solely by way of example. Neither is the working of this invention limited by conditions of temperature or pressure.

It will also be understood that my invention is not confined to apparatus in which the catalytic bed is contained in vertical tubes of circular cross-section as described above. The invention is equally applicable to apparatus in which the catalyst vessel is of any other form suitable for the required reaction.

In particular the catalyst may be contained in the annular space between two concentric tubes, or even between the parallel walls of two or more containers of other than circular cross-section, around and through which retaining tubes or walls a temperature regulating fluid is circulated. It will also be understood that, whereas I have stated that in a preferred embodiment of this invention the synthesis gas contains carbonmonoxide and hydrogen, suitable gas mixtures for carrying on hydrocarbon synthesis to which this invention is applicable may properly contain also carbon-dioxide, water vapor, nitrogen and low molecular weight hydrocarbons such as members of methane series and my invention is equally applicable to these also.

My invention is not to be limited to any theory of the mechanism of the reactions nor to any specific example which was given merely for purpose of illustration, but only by the following claims in which I wish to claim all novelty inherent in my invention.

What I claim and desire to secure by Letters Patent is:

1. The method of preventing overheating of a catalyst for exothermic reactions between gases which comprises initially passing the gases over the catalyst at a flow rate substantially below the desired full flow rate and subsequently increasing the rate of flow inversely as a function of temperature to the desired full rate.

2. In a catalytic process for synthesizing hydrocarbons from gaseous mixtures containing carbon-monoxide and hydrogen, the method of preventing overheating of the catalyst and an excessive rise in the reaction temperature which comprises initially passing the gaseous mixture over the catalyst at a flow rate substantially below the desired full flow rate and increasing the flow rate to the desired full rate in such increments that an excessive rise in the catalyst temperature and the reaction temperature is prevented.

3. The process according to claim 2 in which the initial flow rate and its increments of increase are so chosen that the hottest layer of the catalyst will not rise more than about 54° F. above the predetermined reaction temperature.

4. The process according to claim 2 in which the catalyst is a granular, porous mass arranged gated form arranged between two concentric in a highly elongated form.

5. The process according to claim 2 in which the catalyst is a granular mass of highly eloncylindrical surfaces.

6. In a catalytic process for synthesizing hydrocarbons from gaseous mixtures containing carbon monoxide and hydrogen over a catalyst comprising a metal selected from the group consisting of nickel and cobalt, the method of preventing overheating of the catalyst and an excessive rise in the reaction temperature which comprises initially passing the gases over the catalyst at a flow rate substantially below the desired full flow rate and increasing the flow rate to the desired flow rate in such increments that an excessive rise in the catalyst temperature and the reaction temperature is prevented.

WILLIAM WHALLEY MYDDLETON.

CERTIFICATE OF CORRECTION.

Patent No. 2,255,126.  September 9, 1941.

WILLIAM WHALLEY MYDDLETON.

It is hereby certified that error appears in the printed specification of the above numbered patent requiring correction as follows: Page 3, second column, line 6, claim 4, strike out the syllable and words "gated form arranged between two concentric" and insert the same before "cylindrical" in line 10, claim 5; and that the said Letters Patent should be read with this correction therein that the same may conform to the record of the case in the Patent Office.

Signed and sealed this 11th day of November, A. D. 1941.

(Seal)

Henry Van Arsdale,
Acting Commissioner of Patents.